United States Patent
Iyengar et al.

(10) Patent No.: US 7,855,004 B2
(45) Date of Patent: Dec. 21, 2010

(54) MID-SECTIONAL FUEL DISTRIBUTOR FOR FUEL CELLS

(75) Inventors: Arun K. S Iyengar, Delmont, PA (US); Raymond A George, Pittsburgh, PA (US); Richard E Kothmann, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 1469 days.

(21) Appl. No.: 11/249,792

(22) Filed: Oct. 13, 2005

(65) Prior Publication Data

US 2007/0087254 A1    Apr. 19, 2007

(51) Int. Cl.
*H01M 8/10* (2006.01)
(52) U.S. Cl. ........................... 429/34; 429/38
(58) Field of Classification Search .................. 429/12, 429/13, 34, 36, 38, 35
See application file for complete search history.

(56) References Cited

U.S. PATENT DOCUMENTS 5,733,675 A * 3/1998 Dederer et al. ............... 429/19
2003/0054209 A1    3/2003 Gillett et al.
2003/0203263 A1 * 10/2003 Brown et al. ................ 429/31
2004/0091763 A1 * 5/2004 Drake ......................... 429/34

FOREIGN PATENT DOCUMENTS

EP    1 174 938 A2    1/2002

* cited by examiner

*Primary Examiner*—Jennifer Michener
*Assistant Examiner*—Monique Wills

(57) ABSTRACT

In one embodiment the present comprises an air inlet 2, a series of fuel cells 6, a new fuel inlet 14, a fuel distributor 16, a recirculation plenum 19, and an exhaust 12. Fresh fuel from the fuel distributor 16 enters the fuel cell stack in a middle-third section of the fuel cell stack, and the fresh fuel is divided into an exhaust fuel 12 flow and a recirculation fuel flow 18. The exhaust fuel flow passes along a first portion of the series of fuel cells to the exhaust, and the recirculation fuel flow passes along a second portion of the series of fuel cells to the recirculation plenum and mixes with new fuel from the new fuel inlet in the fuel distributor. The recirculation plenum is located at an opposite end of the fuel cell stack from the exhaust, and the fuel-cell stack is of a seal-less design.

18 Claims, 4 Drawing Sheets

MID-SECTIONAL FUEL DISTRIBUTOR FOR FUEL CELLS

FIELD OF THE INVENTION

The field of the invention relates to fuel cells, and more specifically to fuel distributors of fuel cells.

BACKGROUND

The dynamics of fuel cell stacks require that fuel enters the stack from the opposite end of where the ambient air enters. As the fuel travels over cells, down the length of the stack, it becomes depleted, so that when the fuel mixes with the air it does not produce a volatile combination. Even if the air and fuel portions of the stack are compartmentalized, the fuel cannot enter the stack near the air since any amount of seepage will produce a volatile mixture.

In prior art tubular solid oxide fuel cell (SOFC) generators, the SOFC geometry is cylindrical with one closed end. Fuel enters the stack at the cell closed end and flows upward in the space surrounding the cells. Air enters each cell through an air feed tube (AFT) concentrically positioned within the cell, exits the AFT at the closed end, and flows upward in the annular space between the AFT and the cell. As the fuel and air flow from the cell closed end to the open end, most of the fuel is electrochemically reacted with oxygen from the air producing electricity. The depleted fuel exiting the cell stack, which typically consists of 20% ($H_2+CO$) and 80% ($H_2O+CO_2$), is combusted with the depleted air exiting the cell in a combustion zone above the cell open ends to create exhaust gas. In this configuration no seals are required to separate the fuel stream from the air stream due to the closed end design of the tubular SOFC and the use of AFT's.

An example of a standard fuel cell is shown in FIG. 1. Ambient air 2 enters the SOFC generator 4 and is channeled into capped fuel cells 6 via tubes 8. The air then passes back up the tubes, transferring electrons along the cell until it enters the recuperator/combustion zone and is exhausted 12. The fuel enters the stack 4 via a fuel ejector 16 that mixes it with partially depleted fuel 18 from the recirculation plenum 19, where it enters the stack 4 at the opposite end from the air 2. As the fuel flows along the outside of the cells in the stack active/reformer area 17, it becomes depleted. Some of the partially depleted fuel is then drawn off and recirculated as discussed, while the rest enters the recuperator and is mixed with the air and exhausted 12. Examples of this type of fuel cell can be found in U.S. Pat. No. 6,764,784 by Gillett, et al, which also introduces further improvements such as purge areas.

While this type of design reduces the volatility risk of mixing air with non-depleted fuel, it adds complexity with the tube-cell arrangement illustrated. Adding a tube 8 down the middle of a fuel cell 6 is difficult and makes the stack fragile. What is needed is a method and apparatus that can add fuel to the stack without the need for expensive and complex tubing. In addition, the stacks of the prior art have air pressure that is higher than the pressure of the fuel from the fuel ejector 16, which requires that the air inlet plenum be leak tight so that air does not leak into the fuel space. Therefore, what is also needed is a method and apparatus that reduces or eliminates the contamination of air into the recirculated fuel flow. More importantly, prior art stack designs can work for cylindrical SOFC's with one closed end but do not work well for flat, tubular SOFC's where the air channels are so small. For such high power density fuel cells the preferred configuration is two open ends, which eliminates the AFT but introduces a new problem of preventing air leaks into the inlet fuel. Also, two open ends are preferred for flat tubular cells due to cell fabrication and operational issues.

Other difficulties with the prior art also exist, some of which will be apparent upon further reading.

SUMMARY OF THE INVENTION

With the foregoing in mind, methods and apparatuses consistent with the present invention, which inter alia facilitates the flow of air and fuel through a fuel cell by introducing the fuel in a mid-third section of the cell. This invention is provided particular embodiments by a fuel cell stack that comprises an air inlet, a series of fuel cells, a new fuel inlet, a fuel distributor, a recirculation plenum, and an exhaust. Fresh fuel from the fuel distributor enters the fuel cell stack in a middle-third section of the fuel cell stack, and the fresh fuel is divided into an exhaust fuel flow and a recirculation fuel flow. The exhaust fuel flow passes along a first portion of the series of fuel cells to the exhaust, and the recirculation fuel flow passes along a second portion of the series of fuel cells to the recirculation plenum and mixes with new fuel from the new fuel inlet in the fuel distributor. The recirculation plenum is located at an opposite end of the fuel cell stack from the exhaust, and the fuel-cell stack is of a seal-less design. In some embodiments the fuel cells are of flat, tubular solid oxide fuel cell design.

In a related embodiment, the pressure inside of the recirculation plenum is equal to or greater than the pressure located at the air inlet. In further embodiments the series of fuel cells are linear and uncapped and air from the air inlet passes through a single fuel cell once before being exhausted. Although more traditional configurations of air from the air inlet passing through a tube and into a capped fuel cell may also be used.

In another embodiment the present invention provides for a fuel cell stack that comprises a fresh fuel flow from a fuel distributor that enters the fuel cell stack in a middle-third section, the fresh fuel flow is divided into an exhaust fuel flow and a recirculation fuel flow. At least one fuel cell is uncapped and receives air from an air source and exhausts the air to an exhaust located at one end of the fuel cell stack. The exhaust fuel flow passes over at least one fuel cell in the direction of the exhaust, and the recirculation fuel flow passes over at least one fuel cell in the direction of the air source. A recirculation plenum that receives the recirculation fuel flow is located at an end of the fuel cell stack opposite the exhaust, and the fuel distributor receives the recirculation fuel flow and a new fuel flow to produce the fresh fuel flow. The amount of the fresh fuel flow is approximately equal to the amount of the exhaust fuel flow, and the pressure in the recirculation plenum is greater than the pressure from the air source.

In related embodiments, the fresh fuel flow enters the fuel cell stack closer to the exhaust than the air source. The recirculation plenum is separated from the air source by high impedance leakage barrier, and the recirculation plenum is located in proximity to the air source.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

Figure 1:
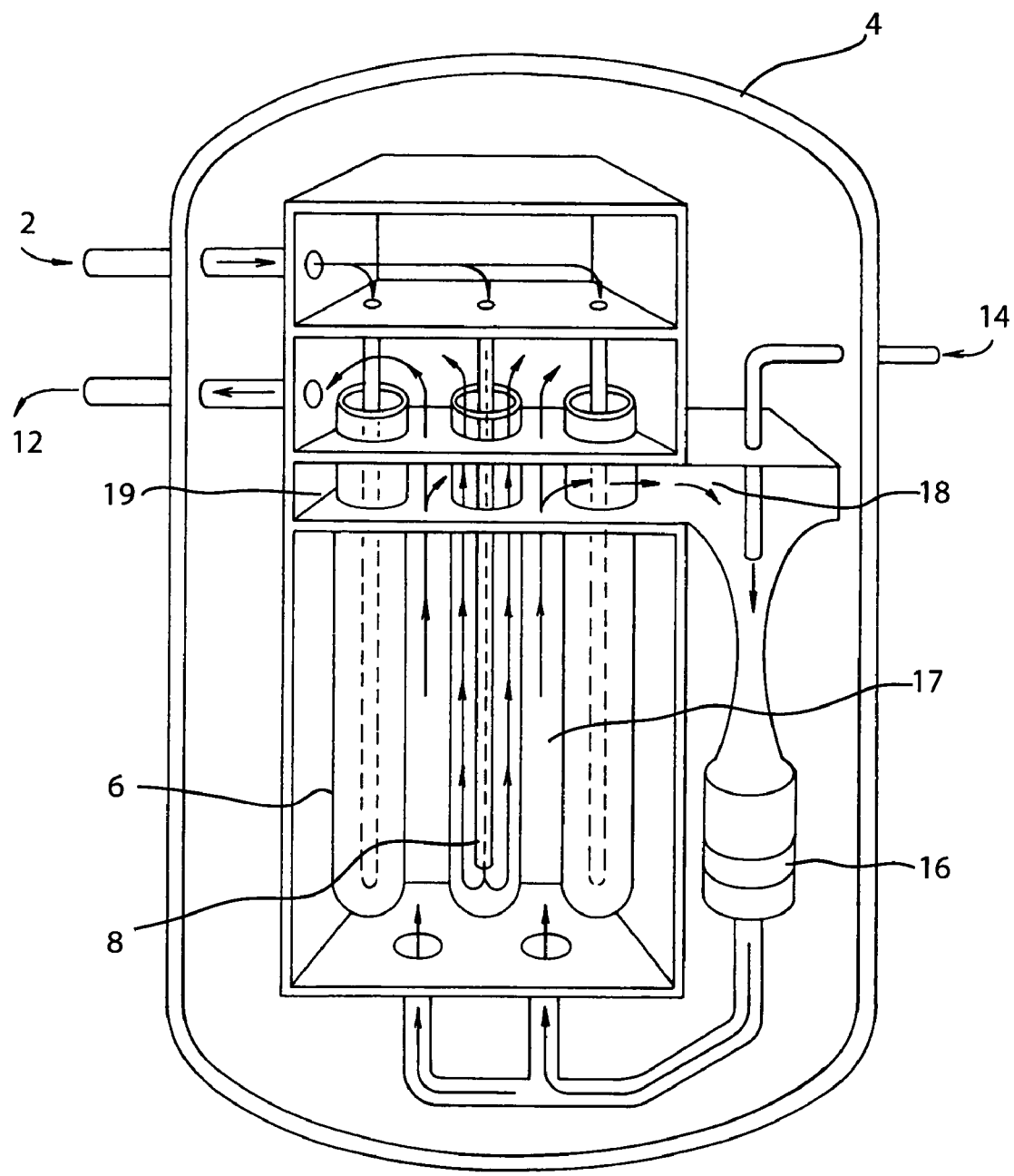
FIG. 1 illustrates a typical fuel cell of the prior art.

The present invention provides for fuel cell stacks that introduce fuel from the fuel distributor to the middle-third section of the stack reformer. In the prior art, fuel from the fuel distributor is added to an end of the stack opposite that of where the air enters. This arrangement doesn't let fresh fuel from the fuel distributor mix with the air supply, even if there are leaks in internal barriers. However, it not only requires elaborate tube within cell arrangements but also results in economic penalties and fabrication difficulties for similar implementations with flat tubular cell configurations, such as the high power density cells. It can also potentially let air seep into the partially-depleted fuel that is being recirculated.

The present invention introduces fresh fuel from the fuel distributor into the middle-third portion of the stack. By this arrangement fuel from the fuel distributor that is destined for recirculation is immediately separated from fuel destined for exhaust. The pressure of the fuel being recirculated can be kept higher then the pressure of the inflowing air, so that seepage at the barrier between the fuel and air will leak fuel to air rather than the other ways around. Since the fuel enters the stack in the mid-third section, by the time it progresses to the air/fuel barrier, it is depleted enough that any seepage into the air flow will not produce a volatile mixture. In addition, the recirculation plenum is now set at the opposite end of the stack from the exhaust. This maintains the seal-less design improvements of the prior art. The air flow is guided directly into fuel cells without the need to inject the air down a tube to the end of the cell as is the practice of the prior art, producing a once-through airflow design that can be manufactured more easily.

Although tube-less cell and once-through airflow designs are possible with the present invention, aspects of the invention can also be applied to multiple-pass airflow designs as well as tube-in-cell arrangements. Examples of such embodiments are given below.

The present invention injects fuel from the fuel distributor into the middle-third portion of the fuel stack. This new fuel may be referred to as fresh fuel, although one of ordinary skill in the art understands that it is actually fresh fuel mixed with partially-depleted fuel. Similarly, the partially-depleted fuel that is mixed with the fresh fuel and recirculated or mixed with air and exhausted may both be referred to as depleted fuel or partially-depleted fuel interchangeably, and is also known as lean fuel in the art. In the prior art the depleted fuel destined for recirculation or exhaustion were drawn off of the same stream. In the present invention these two flows are separated out as soon as the fresh fuel enters the stack; therefore, the new terms "exhaust fuel flow" and "recirculation fuel flow" may both be used herein respectively.

In the present invention, the fuel distributor injects fresh fuel into the stack in the mid-third section. This is in part a fictitious section for the purposes of the present invention in that the stacks are not routinely divided into thirds and do not have indications as such. However, like all things, the stacks have bottom, middle and top thirds, and the present invention injects the fresh fuel into the middle third. In particular embodiments the fresh fuel is injected closer to the middle of the stack, and in other embodiments it is injected closer to the exhaust-end of the stack. The fuel can also be injected at a distance up the stack equal to the recirculation fraction of the cell active length to maintain the same exit Nernst voltage at both ends of the cell. The invention is equally applicable to tubular cells as well as the flatter and higher power density (HPD) cells.

Figure 2:
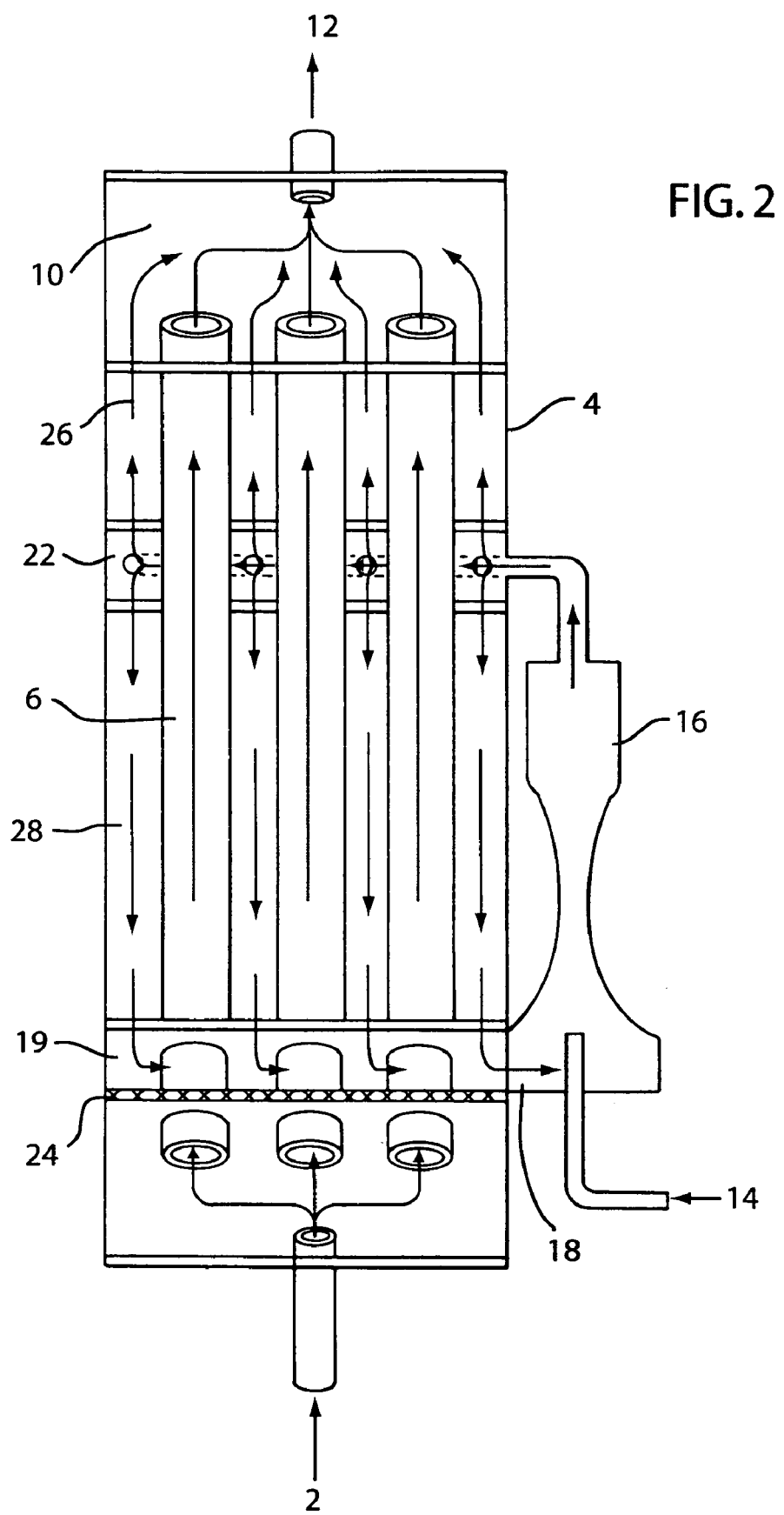
FIG. 2 illustrates an embodiment of the present invention with uncapped, straight fuel cell.

Referring to FIG. 2, one embodiment of the present invention is shown. Unlike the prior art typified in FIG. 1, the present invention utilizes a mid-third entry of the fuel from the fuel ejector/recirculator 16 into the stack. This may require a pipe-line and/or distributor 22 to evenly spread the fresh fuel along the width of the stack. A portion of the fresh fuel 26 is drawn towards the exhaust, while the rest 28 is drawn towards the recirculation plenum 19. The seal-less design uses a high impedance barrier 24 that keeps the depleted fuel and the air 2 from mixing. However, since the pressure within the recirculation plenum 19 can readily be made greater than the pressure of the air intake, any seepage will be depleted fuel to the air flow, rather than vice versa. The unreacted seepage fuel combusts in the air inlet plenum, flows through the cells and exits the generator 12. An alternative design is the fuel ejector/recirculator pulling recirculation gas from two recirculation plenums located at each end of the cell.

The amount of exhaust fuel 26 to recirculated fuel 28 is approximately 1:2 (33%). The volume or amount of exhaust fuel will be approximately equal to the amount of new fuel 14 added to the system. The high impedance barrier 24 is different than a seal.

Figure 3:
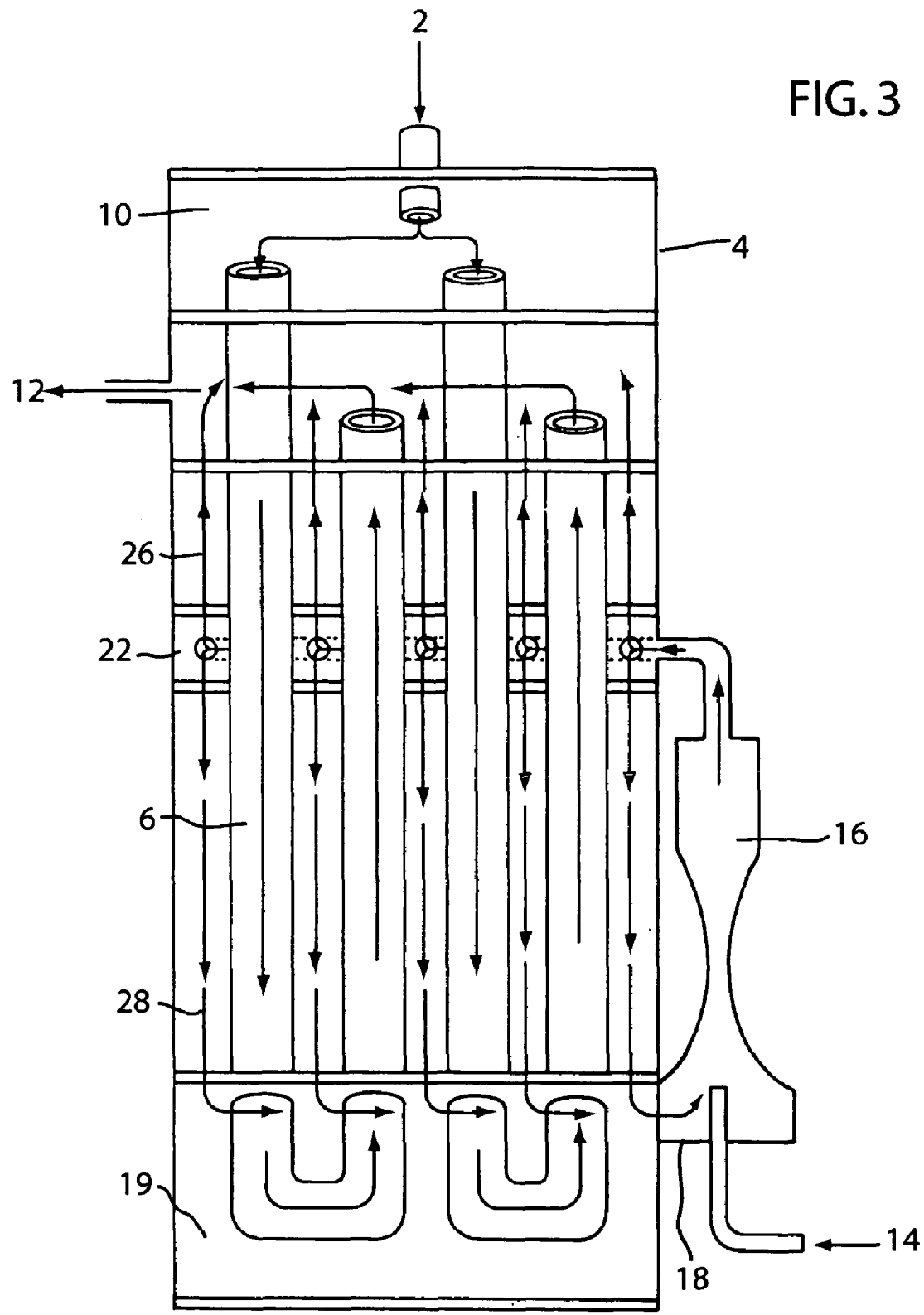
FIG. 3 illustrates an embodiment of the present invention with uncapped fuel cells arranged in a fashion such that the air flow passes through two cells before exhaustion.

Although a seal arrangement could be used with the present invention, it is preferred to use the seal-less designs that have marked improvements in the art. Additionally, non-capped and tubeless cells can be used with the present invention; which means that the air flow may take a single pass through the fuel cells. This single pass through the fuel cell design may be configured such that the air itself passes through the stack twice or more before being exhausted. An example of such an arrangement is shown in FIG. 3, which may be a U-shaped cell or two cells joined by a connector. For this configuration fuel pressure in the recirculation plenum 19 must be greater than air pressure or else air will leak into the recirculated gas.

As shown, the use of the present invention can eliminate the need for high temperature seals in tubular SOFC's with two open ends. Cylindrical SOFC's with one closed end of the prior art do not require seals but they do require air feed tubes. Although the figures have shown cylindrical fuel cell, this invention is particularly applicable to flat, tubular SOFC's (high power density SOFC's) open at both ends and having many small air channels per cell. In flat, tubular SOFC's with one closed end, the use of air feed tubes is not commercially viable since the air feed tube diameter would be so small in order to fit in the air channel (high air pumping power) and many air feed tubes (5 to 10) per cell would be required compared to only one for the cylindrical SOFC. Another SOFC design is planar, which requires high temperature seals. The major advantage of planar SOFC's is high power density but the major disadvantage is the need for high temperature seals, which historically have been unreliable. A flat, tubular SOFC with the present invention could achieve the power density advantage of planar without the disadvantage of seals.

Figure 4:
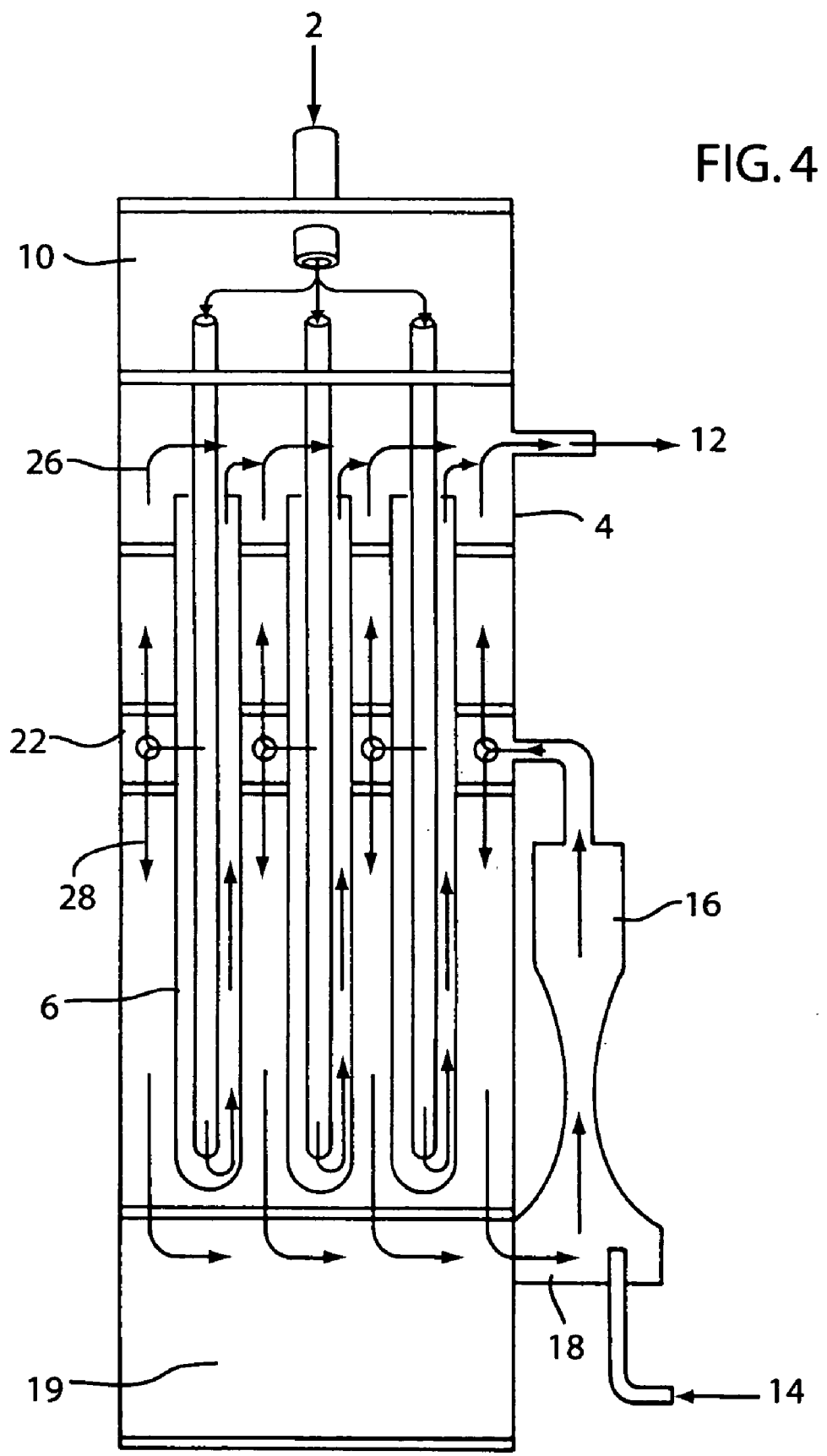
FIG. 4 illustrates an embodiment of the present invention using tube-in-cell configurations.

The use of non-capped cells also eliminates the need for tubes to be inserted inside of the cells. As explained above, this removes one of the most fragile elements of the fuel cell stack. However, advantages of the present invention may also be used with the tube-in-cell configurations. FIG. 4 illustrates an example of this. In this configuration air cannot leak into the recirculated gas.

In one embodiment the present invention provides for a fuel cell stack that comprises an air inlet, a series of fuel cells, a new fuel inlet, a fuel distributor, a recirculation plenum, and an exhaust. Fresh fuel from the fuel distributor enters the fuel cell stack in a middle-third section of the fuel cell stack, and the fresh fuel is divided into an exhaust fuel flow and a recirculation fuel flow. The exhaust fuel flow passes along a first portion of the series of fuel cells to the exhaust, and the recirculation fuel flow passes along a second portion of the series of fuel cells to the recirculation plenum and mixes with new fuel from the new fuel inlet in the fuel distributor. The recirculation plenum is located at an opposite end of the fuel cell stack from the exhaust, and the fuel-cell stack is of a seal-less design.

In a related embodiment, the pressure inside of the recirculation plenum is equal to or greater than the pressure located at the air inlet. In further embodiments the series of fuel cells are linear and uncapped and air from the air inlet passes through a single fuel cell once before being exhausted. Although more traditional configurations of air from the air inlet passing through a tube and into a capped fuel cell may also be used.

In alternative embodiments, air from the air inlet passes through two fuel cells before being exhausted. Fresh fuel from the fuel distributor enters the fuel cell stack closer to the exhaust end of the fuel cell stack. And the air inlet is located at an opposite end of the fuel cell stack from the exhaust. In another embodiment the recirculation plenum is separated from the air inlet by high impedance leakage barrier.

In some embodiments the portion of fresh fuel portioned to the exhaust fuel flow relative to the recirculation fuel flow is between 1:4 (20%) and 1:1 (50%). In a refined embodiment, the portion of fresh fuel portioned to the exhaust fuel flow relative to the recirculation fuel flow is approximately 1:2 (33%).

In another embodiment the present invention provides for a fuel cell stack that comprises a fresh fuel flow from a fuel distributor that enters the fuel cell stack in a middle-third section, and the fresh fuel flow is divided into an exhaust fuel flow and a recirculation fuel flow. At least one fuel cell is uncapped and receives air from an air source and exhausts the air to an exhaust located at one end of the fuel cell stack. The exhaust fuel flow passes over at least one fuel cell in the direction of the exhaust, and the recirculation fuel flow passes over at least one fuel cell in the direction of the air source. A recirculation plenum receives the recirculation fuel flow and is located at an end of the fuel cell stack opposite the exhaust, and the fuel distributor receives the recirculation fuel flow and a new fuel flow to produce the fresh fuel flow. The amount of the fresh fuel flow is approximately equal to the amount of the exhaust fuel flow, and the pressure in the recirculation plenum is greater than the pressure from the air source. In some embodiments the fuel cells are of flat, tubular solid oxide fuel cell design.

In related embodiments, the fresh fuel flow enters the fuel cell stack closer to the exhaust than the air source. The recirculation plenum is separated from the air source by high impedance leakage barrier, and the recirculation plenum is located in proximity to the air source.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A fuel cell stack comprising:
   an air inlet;
   a series of fuel cells;
   a new fuel inlet;
   a fuel distributor;
   a fuel recirculation plenum; and
   an exhaust;
   wherein fresh fuel from said fuel distributor enters said fuel cell stack in a middle third section of said fuel cell stack, and wherein said fresh fuel is divided into an exhaust fuel flow and a recirculation fuel flow;
   wherein said exhaust fuel flow passes along a first portion of said series of fuel cells to said exhaust, and wherein said recirculation fuel flow passes along a second portion of said series of fuel cells to said fuel recirculation plenum and mixes with new fuel from said new fuel inlet in said fuel distributor;
   wherein said fuel recirculation plenum is located at an opposite end of said fuel cell stack from said exhaust.

2. The fuel cell stack of claim 1, wherein pressure inside of said recirculation plenum is equal to or greater than the pressure located at said air inlet.

3. The fuel cell stack of claim 1, wherein said series of fuel cells are linear and uncapped.

4. The fuel cell stack of claim 1, wherein air from said air inlet passes through a single fuel cell once before being exhausted.

5. The fuel cell stack of claim 1, wherein air from said air inlet passes through a tube and into a capped fuel cell.

6. The fuel cell stack of claim 1, wherein air from said air inlet passes through two fuel cells before being exhausted.

7. The fuel cell stack of claim 1, wherein fresh fuel from said fuel distributor enters said fuel cell stack closer to the exhaust end of said fuel cell stack.

8. The fuel cell stack of claim 1, wherein said air inlet is located at an opposite end of said fuel cell stack from said exhaust.

9. The fuel cell stack of claim 1, wherein the portion of fresh fuel portioned to said exhaust fuel flow relative to said recirculation fuel flow is between 1:4 (20%) and 1:1 (50%).

10. The fuel cell stack of claim 9, wherein the portion of fresh fuel portioned to said exhaust fuel flow relative to said recirculation fuel flow is approximately 1:2 (33%).

11. The fuel cell stack of claim 1, wherein said recirculation plenum is separated from said air inlet by impedance leakage barrier.

12. The fuel cell stack of claim 1, wherein said fuel distributor further comprises a recirculator.

13. The fuel cell stack of claim 1, wherein said fuel distributor further comprises an ejector.

14. A fuel cell stack comprising:
   a fresh fuel flow from a fuel distributor that enters said fuel cell stack in a middle-third section, wherein said fresh fuel flow is divided into an exhaust fuel flow and a recirculation fuel flow;
   at least one fuel cell that is uncapped and receives air from an air source and exhausts said air to an exhaust located at one end of said fuel cell stack, wherein said exhaust fuel flow passes over said at least one fuel cell in the direction of said exhaust, and wherein said recirculation fuel flow passes over said at least one fuel cell in the direction of said air source;

a fuel recirculation plenum that receives said recirculation fuel flow and is located at an end of said fuel cell stack opposite said exhaust;

wherein said fuel distributor receives said recirculation fuel flow and a new fuel flow to produce said fresh fuel flow, wherein the amount of said fresh fuel flow is approximately equal to the amount of said exhaust fuel flow;

wherein the pressure in said fuel recirculation plenum is greater than the pressure from said air source.

15. The fuel cell stack of claim 14, wherein said fresh fuel flow enters said fuel cell stack closer to said exhaust than said air source.

16. The fuel cell stack of claim 14, wherein said recirculation plenum is separated from said air source by impedance leakage barrier.

17. The fuel cell stack of claim 14, wherein said recirculation plenum is located in proximity to said air source.

18. The fuel cell stack of claim 14, wherein said fuel cells are of flat, tubular solid oxide fuel cell design.

* * * * *